US012776672B2

(12) United States Patent
Zhang et al.

(10) Patent No.: US 12,776,672 B2
(45) Date of Patent: Oct. 27, 2026

(54) PERMANENT MAGNETIC WITH SLOT-SHAPED RECESSES

(71) Applicant: Brose Fahrzeugteile SE & Co. Kommanditgesellschaft, Würzburg, Würzburg (DE)

(72) Inventors: Shunli Zhang, Eindhoven (NL); Wei Zhang, Shanghai (CN)

(73) Assignee: Brose Fahrzeugteile SE & Co. Kommanditesellschaft, Würzburg, Würzburg (DE)

( * ) Notice: Subject to any disclaimer, the term of this patent is extended or adjusted under 35 U.S.C. 154(b) by 271 days.

(21) Appl. No.: 18/604,770

(22) Filed: Mar. 14, 2024

(65) Prior Publication Data

US 2024/0283304 A1 Aug. 22, 2024

Related U.S. Application Data

(63) Continuation of application No. PCT/EP2022/072465, filed on Aug. 10, 2022.

(30) Foreign Application Priority Data

Sep. 14, 2021 (CN) ........................ 202111073105.6

(51) Int. Cl.
*H02K 1/06* (2006.01)

(52) U.S. Cl.
CPC ...................................... *H02K 1/06* (2013.01)

(58) Field of Classification Search
CPC .. H02K 1/06; H01F 7/02; H01F 7/021; H01F 7/0273; H01F 7/0284; H01F 2027/348
USPC .......................... 310/152; 335/302, 304, 306
See application file for complete search history.

(56) References Cited

U.S. PATENT DOCUMENTS

| | | | | |
|---|---|---|---|---|
| 6,359,359 B1 * | 3/2002 | Miura | H01F 7/021 310/156.43 |
| 10,666,099 B1 * | 5/2020 | Fatemi | H02K 1/276 |
| 2025/0079057 A1 * | 3/2025 | Naumoski | H01F 7/021 |

FOREIGN PATENT DOCUMENTS

| | | | | |
|---|---|---|---|---|
| CN | 110890798 A * | 3/2020 | H02K 1/06 |
| CN | 112531940 A | 3/2021 | |
| EP | 2760112 A1 | 7/2014 | |
| EP | 3457532 A1 * | 3/2019 | H02K 15/03 |
| JP | S61208815 A | 9/1986 | |

OTHER PUBLICATIONS

Machine translation of CN-110890798-A. (Year: 2020).*

* cited by examiner

*Primary Examiner* — Michael Andrews
(74) *Attorney, Agent, or Firm* — Laurence A. Greenberg; Werner H. Stemer; Ralph E. Locher

(57) ABSTRACT

A magnetic element for an electric machine is formed of a single-piece magnetic body made of a permanently magnetic material. The magnetic body has two longitudinal sides extending in a longitudinal direction and two transverse sides extending in a cross direction. A number of mutually parallel, slit-shaped first recesses are formed in the magnetic body. The first recesses extend from a first side to a center of the magnetic body. A number of mutually parallel, slit-shaped second recesses are formed in the magnetic body. The second recesses extend from a second side, which is opposite from the first side, to the center of the magnetic body.

14 Claims, 3 Drawing Sheets

PERMANENT MAGNETIC WITH SLOT-SHAPED RECESSES

FIELD AND BACKGROUND OF THE INVENTION

The invention relates to a permanently magnetic element for an electric machine as well as an electric machine with such a magnetic element.

Electric motors are used in various ways as a drive in a modern motor vehicle. Electric motors are used, for example, as window regulators, sliding roof or seat adjustment drives, as steering drives (EPS, Electrical Power Steering), as cooling fan drives or as transmission actuators. Such electric motors must have a relatively high torque or power density and also be operationally reliable at high temperatures.

An electric motor as an energy converter of electrical energy into mechanical energy comprises a stator which forms the stationary motor part and a rotor which forms the moving motor part.

An in particular brushless electric motor as an electric (three-phase current) machine normally has a stator provided with a field or stator winding, which stator is arranged coaxially to a rotor with one or more permanent magnets (rotor magnets). A permanent magnet is in this case a magnet composed of a hard magnetic material which has a constant magnetic field without having to expend electrical power as in the case of electromagnets.

During operation, as a result of rotor rotation, the rotor magnets are exposed to a magnetic field which is chronologically and/or spatially changeable so that, in the case of brushless permanent magnet machines, high power losses can arise as a result of the eddy current effect. The power loss of permanent magnets, such as, for example, sintered NdFeB permanent magnets, can generate a significant amount of heat. The heat loss leads to an increase in temperature of the magnetic material, wherein the permanent magnet is demagnetized when a threshold temperature is reached or exceeded and thereby loses its magnetization and magnetic field.

In order to reduce this risk of demagnetization, rotor magnets are generally split up into several smaller magnets or segments in order to minimize eddy current losses. This means that the magnetic body of such a rotor magnet is of multi-piece or multi-part design, i.e. has several individual segments which are typically joined with an adhesive in a materially bonded manner to the rotor magnet or magnetic body. This joining or lamination of individual magnet segments to a magnetic body or magnetic element is also referred to as "segmentation bonding". The disadvantage of such a segmented or laminated rotor magnet is the increase in costs and the increase in production cycle time. The manufacturing tolerances of the electromagnetic active parts furthermore reduce the robustness of the motor power.

The company Bomatec sells magnetic elements with a one-piece magnetic body in the case of which, in order to reduce the eddy current losses, a single continuous or interruption-free, spiral-shaped, serpentine-shaped or meandering "snakeline" is incorporated as a recess into the magnetic body. The snakeline is wire-eroded in a high-precision manner into a finished magnet, as a result of which steps such as cutting, stacking and gluing of individual segments are dispensed with.

The magnetic body is not divided by the snakeline, but the spreading of the eddy currents within the magnetic body is suppressed by the snakeline, as a result of which the eddy current losses in the magnetic body are reduced. The snakeline generally has in this case several parallel snaking or meandering bends, as a result of which the electric conductivity perpendicular to the snaking bends is reduced. Since only a continuous recess is incorporated as a snakeline into the magnetic body, this method, however, has the disadvantage that it has either only a limited reduction in longitudinal conductivity or only a limited reduction in transverse conductivity.

SUMMARY OF THE INVENTION

The object on which the invention is based is to indicate a particularly suitable magnetic element for an electric machine. In particular, eddy current losses in the magnetic body should as far as possible be minimized. Eddy currents should preferably be reduced or suppressed both in the length direction and in the cross direction of the magnetic body. A further object on which the invention is based is to indicate a particularly suitable electric machine with such a magnetic element.

In terms of the magnetic element, the object is achieved according to the invention with the features as claimed and in terms of the electric machine with the features as claimed. Advantageous configurations and further developments are the subject matter of the dependent claims. The advantages and configurations cited in terms of the magnetic element can expediently also be applied to the electric machine and vice versa.

The magnetic element according to the invention is provided for an electric machine, in particular for a brushless permanent magnetic machine, and suitable and configured for this. The magnetic element has in this case a one-piece, i.e. one-part or monolithic, magnetic body composed of an electrically conducting, permanently magnetic material. In other words, the magnetic element is not composed or laminated from individual magnetic segments.

The block-shaped magnetic body is produced from a ferrite or rare earth material. For example, the magnetic body is embodied as a sintered neodymium-iron-boron (NdFeB) permanent magnet. The magnetic body has two longitudinal sides which extend along a longitudinal length direction and two transverse sides which extend in a transversal cross direction thereto. The height or thickness of the magnetic body extends in this case along a vertical direction oriented perpendicularly to the longitudinal direction and cross direction. The transversal width preferably has larger dimensions than the thickness of the magnetic body. The longitudinal length of the magnetic body furthermore has larger dimensions than the width.

The magnetic body has, for example, a trapezoidal, rectangular, circular segment-shaped, arcuate or loaf-like cross-sectional shape in a sectional plane spanned by the cross direction and the vertical direction. The term loaf-shaped cross-sectional shape refers in particular to the shape of a tin-loaf with a rectangular shape in the case of which one of the longitudinal sides is formed to be arched convexly to the outside.

According to the invention, the magnetic body has a number of first recesses and a number of second recesses. The first and second recesses are in this case arranged in each case parallel to one another and embodied to be slot-shaped. In other words, the recesses are embodied as two groups of parallel slots. The recesses extend in each case from one of the longitudinal sides (or transverse sides) toward the center of the magnetic body. In other words, the magnetic body is provided on both sides with in each case a number of slots. According to the invention, in particular a fishbone pattern is therefore incorporated into the magnetic body. As a result of the fishbone arrangement of the slots or recesses through the magnetic body, eddy current losses can be reduced particularly effectively. At the same time, the production costs can be reduced in comparison with the "segmentation bonding" approach. As a result of this, a particularly suitable magnetic element is realized.

Such a recess or fishbone pattern makes it possible that the magnetic body remains integral as a single piece and that simultaneously the eddy current losses are reduced to a minimum.

In one preferred configuration, the recesses are incorporated into the magnetic body in such a manner that, in the case of a magnetic field oriented perpendicular to the length direction and cross direction, the spreading of magnetically induced eddy currents both along the length direction and along the cross direction in the magnetic body are suppressed. The eddy current path in the magnetic body is thus interrupted in the transverse and length direction by the first and second recesses. In other words, a two-dimensional eddy current path separation is realized by the fishbone pattern. In contrast, only a one-dimensional eddy current path separation is performed by a conventional snakeline. Magnetic eddy current losses in the magnetic body are particularly effectively reduced by the two-dimensional separation so that the magnetic element has a particularly low risk of demagnetization during operation of the electric machine.

In one preferred further development, the first and second recesses are oriented obliquely with respect to the length direction and to the cross direction. As a result of the oblique or inclined arrangement of the parallel recesses, a reliable and simple suppression of the eddy current spread is realized both in the length direction and in the cross direction.

In one expedient formation, the recesses are oriented at an angle of inclination between 60° and 30°, in particular between 50° and 40°, for example, 45°, with respect to the length direction (or cross direction). In particular, the first and second recesses have the same angle in terms of magnitude with respect to the length direction. For example, the first recesses have an angle of inclination of +45° with respect to the length direction, wherein the second recesses have an angle of inclination of −45° with respect to the longitudinal direction. The orientation of the first and second recesses is therefore embodied, for example, in mirror symmetry with respect to the center of the magnetic body.

In one suitable embodiment, the first recesses and the second recesses are arranged offset with respect to one another along the length direction. For example, the second recesses are produced by an axis mirroring at the longitudinal center of the magnetic body and by a longitudinal offset or translation of the first recesses. As a result of this, a fishbone pattern which is particularly suitable in terms of eddy current suppression is realized.

In one conceivable further development, the number of first recesses is equal to the number of second recesses. As a result of this, a symmetrical division of the magnetic body is realized so that a particularly uniform suppression of the eddy currents is enabled. As a result of this, local heat spots in the magnetic body are avoided.

In one advantageous configuration, the recesses are arranged distributed evenly along the respective longitudinal side. This means that the distance between two adjacent recesses is preferably always the same size. As a result of this, a uniform and symmetrical suppression of the eddy currents is further improved.

An additional further aspect of the invention provides that the first recesses and the second recesses are incorporated into the magnetic body by means of wire cutting or wire erosion. As a result of this, a simple and reliable incorporation of the fishbone pattern is enabled. In particular, all the first recesses and/or all the second recesses are incorporated into the magnetic body by means of multi-wire cutting or multi-wire erosion. This means that the number of first recesses and/or second recesses are cut into the magnetic body, for example, by a corresponding number of erosion wires quasi simultaneously. As a result of this, more efficient and effective multi-wire cutting for producing the magnetic element is enabled.

In one possible configuration, the first recesses and/or the second recesses extend beyond the center of the magnetic body. This means that more than half of the recesses penetrate through the magnetic body. The recesses do not cross in this case so that a single magnetic body is furthermore realized. As a result of this, the eddy current suppression is further improved.

The electric machine according to the invention is provided for a motor vehicle and is suitable and configured for it. The machine is embodied, for example, as an electromotive drive of an adjustment part of the motor vehicle. The machine involves in particular a brushless permanent magnetic machine which has a wound machine part and a permanently excited machine part. For example, the wound machine part is embodied as a stator and the permanently excited machine part is embodied as a rotor. In this case, the rotor has at least one magnetic element described above as a rotor magnet. As a result of this, a particularly suitable machine with a particularly low risk of demagnetization is realized.

Exemplary embodiments of the invention are explained in greater detail below on the basis of a drawing. In schematic and simplified perspective representations:

Parts and dimensions which correspond to one another are always provided with the same reference signs in all the figures.

DETAILED DESCRIPTION OF THE INVENTION

Figure 1:
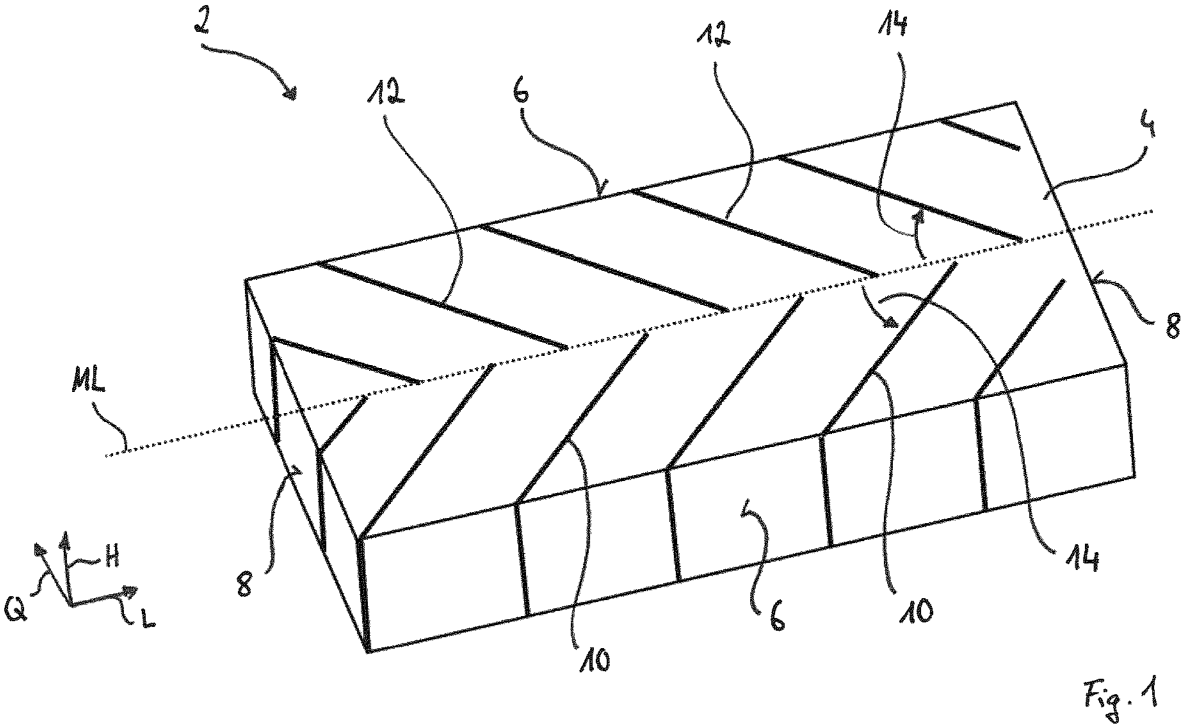
FIG. 1 shows a magnetic element in a first embodiment.

FIG. 1 shows a magnetic element 2 for an electric machine, not shown in greater detail, of a motor vehicle. In this case, the machine is embodied, for example, as a brushless permanent magnetic machine, wherein the magnetic element 2 is embodied in particular as a rotor magnet of a rotor.

The magnetic element 2 has a one-piece, i.e. one-part or monolithic, magnetic body 4 composed of a permanently magnetic material. The block-shaped magnetic body 4 is in this case embodied as a sintered NdFeB permanent magnet. The magnetic body 4 has two longitudinal sides 6 which extend along a longitudinal length direction L and two transverse sides 8 which extend in a transversal cross direction Q thereto. The height or thickness of the magnetic body extends in this case along a vertical direction H oriented perpendicular to the length direction L and cross direction Q.

The magnetic body 4 has in this exemplary embodiment, for example, a rectangular cross-sectional shape in a sectional plane spanned by the cross direction Q and the vertical direction H. Alternatively, the magnetic body 1 can also have a trapezoidal, circular segment-shaped, arcuate or loaf-like cross-sectional shape.

The magnetic element 2 has, for example, a length along the length direction L between 30.5 mm (millimeters) and 32.5 mm, for example, 31 mm. In one suitable dimensioning, the magnetic element 2 has in this case a width along the cross direction Q between 14 mm and 16 mm, for example, 14.77 mm, and a height along the height direction H between 2 mm and 5 mm, for example, 3.28 mm.

A number of first recesses 10 and a number of second recesses 12 pass through the magnetic body 4. The recesses 10, 12 are only by way of example provided with reference signs in the figures. For example, the magnetic body 4 has six parallel recesses 10 and six parallel recesses 12. The recesses 10, 12 are only by way of example provided with reference signs in the figures. The recesses 10, 12 are embodied in this case as oblique slots which extend from the opposing longitudinal sides 6 toward a central (longitudinal) center axis ML of the magnetic body 4. The center axis ML runs in this case along the length direction on half the width of the magnetic body 4.

The recesses 10, 12 substantially completely pass through the magnetic body 4 in this case along the vertical direction H. No piece is, however, cut off or separated from the magnetic body 4 by the recesses 10, 12. The recesses 10, 12 are therefore incorporated into the magnetic body 4 in such a manner that the magnetic body 4 itself remains integral as a single piece. The recesses 10, 12 are incorporated into the magnetic body 4, for example, by means of wire cutting or wire erosion, in particular by means of multi-wire cutting or multi-wire erosion. The magnetic body 4 is thus effectively tangentially and axially segmented in portions by the recesses 10, 12.

The term "axial" or "axial direction" refers here and below in particular to a direction parallel (coaxial) to the longitudinal direction L, i.e. perpendicular to the end sides transverse sides 8. The term "radial" or "radial direction" correspondingly refers here and below in particular to a direction oriented perpendicular (transverse) to the longitudinal direction along a radius of the magnetic body 4. The term "tangential" or "tangential direction" refers here and below in particular to a direction along the circumference of the magnetic body 4 or the magnetic element 2 (circumferential direction, azimuthal direction), i.e. a direction perpendicular to the axial direction and to the radial direction.

Figure 2:
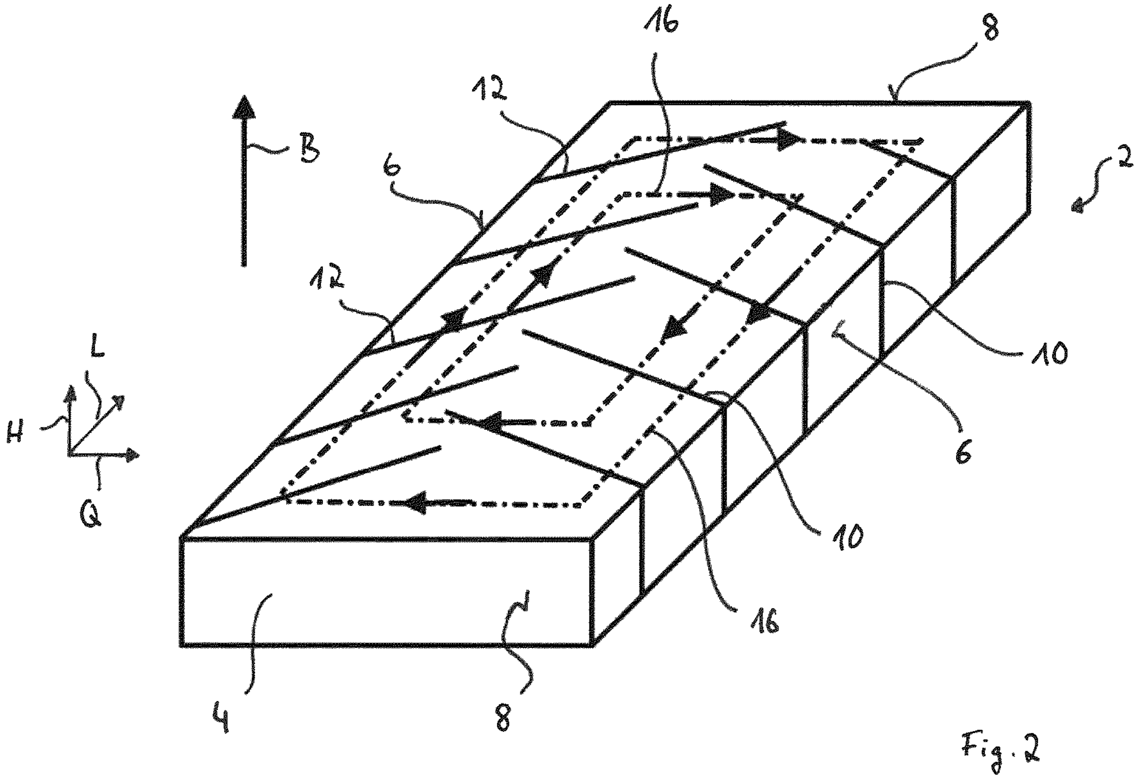
FIG. 2 shows the magnetic element according to the first embodiment in a magnetic field.

The slots or recesses 10, 12 are, in the exemplary embodiment of FIG. 1 and FIG. 2, oriented inclined at an angle of inclination 14 with respect to the center axis ML or with respect to the length direction L oriented parallel thereto, wherein the angle of inclination 14 for the recesses 10, 12 is of the same size. For example, the recesses 10 have an angle of inclination of +45° with respect to the length direction L, wherein the recesses 12 have an angle of inclination of −45° with respect to the length direction.

The recesses 10 and the recesses 12 are arranged distributed evenly in each case parallel along the longitudinal direction on the longitudinal sides 6. The recesses 10, 12 thus form in this embodiment substantially a fishbone-like wire cutting pattern for the magnetic body 4. The fishbone pattern ensures that eddy current losses in the magnetic body 4 are reduced to a minimum during operation of the machine.

During operation of the machine, a magnetic field B oriented parallel to the height direction H occurs which penetrates through the magnetic body 4. The magnetic 13 field B is chronologically changeable so that magnetically induced eddy currents are generated in the magnetic body 4 (FIG. 2). The eddy currents 16 are in this case represented schematically by means of broken-line arrows in FIG. 2. As a result of the oblique orientation of the recesses 10, 12, the eddy currents 16 are suppressed both along the longitudinal direction L and along the cross direction Q in the magnetic body 4. The eddy currents 16 are thus axially and tangentially suppressed. In other words, a two-dimensional eddy current path separation is realized by the fishbone pattern so that the magnetic element 2 has a particularly low risk of demagnetization during operation of the electric machine.

As a result of the recesses 10, 12, the ohmic losses within the magnetic element 2 are reduced, as a result of which the magnetic body 4 heats up to a lesser degree during operation of the machine. For example, a block-shaped or cuboid sintered NdFeB magnetic body 4 with a width of 10 mm (millimeters), a length of 20 mm, and a height of 10 mm, in the case of a magnetic field B of 1 T (Tesla) and a frequency of 1 khZ (kilohertz) without recesses 10, 12 has a power loss of approximately 69.92 W (Watt). A magnetic body 4 which is laminated, for example, from twenty cuboid segments of equal size, has in this case a power loss of 2.15 W. A one-piece magnetic body 4 with the recesses 10, 12 or the fishbone pattern has in this case a power loss of only 0.38 W.

Figure 3:
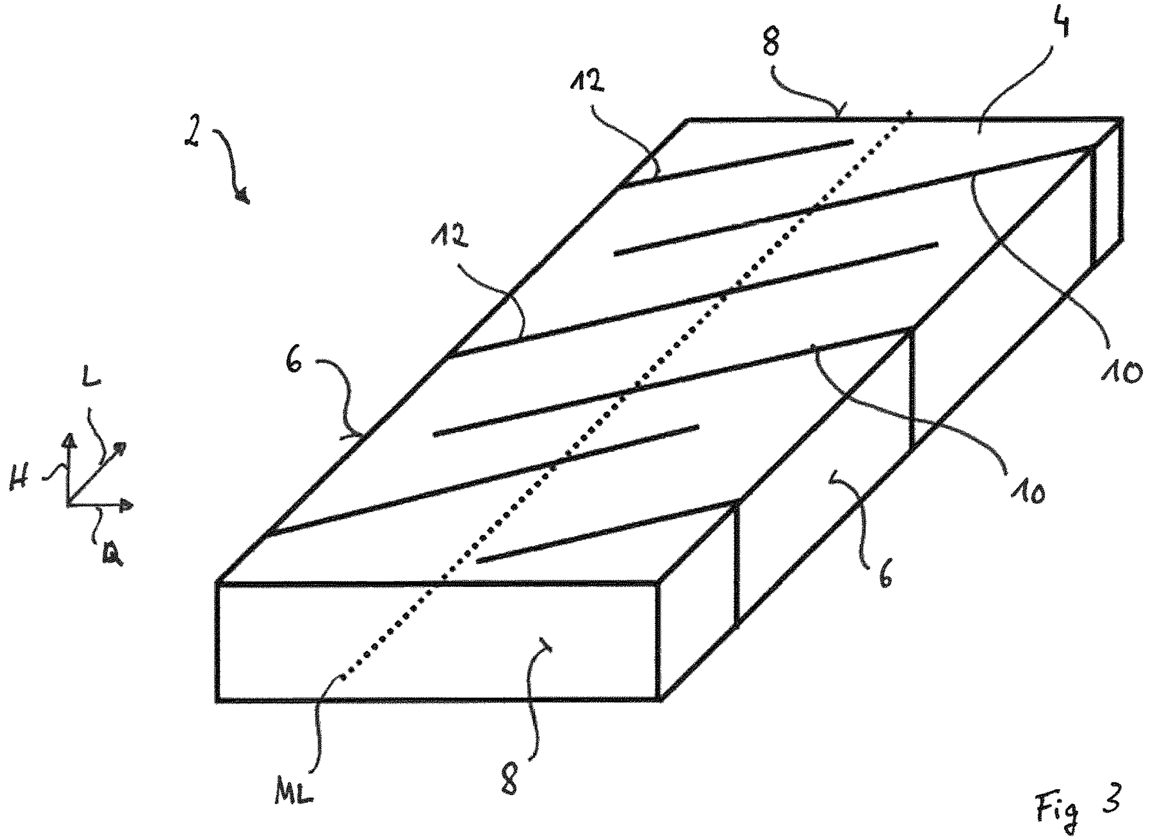
FIG. 3 shows a magnetic element in a second embodiment.

A second embodiment of the magnetic element 2 is represented in FIG. 3. In this embodiment, the recesses 10, 12 are oriented parallel to one another. The recesses 10, 12 are oriented so as to be inclined at the same angle of inclination 14 with respect to the longitudinal direction L and are incorporated into the magnetic body 4 distributed alternately along the longitudinal direction L starting from the longitudinal sides 6. The recesses 10, 12 extend in this case beyond the center of the magnetic body 4, this means that the recesses 10, 12 cross the center axis ML. The magnetic body 4 is thus effectively segmented in portions tangentially and axially by the recesses 10, 12.

An oblique meandering profile of the magnetic body 4 which suppresses the eddy currents 16 both along the length direction L and along the cross direction Q in the magnetic body 4 is realized by the recesses 10, 12.

Figure 4:
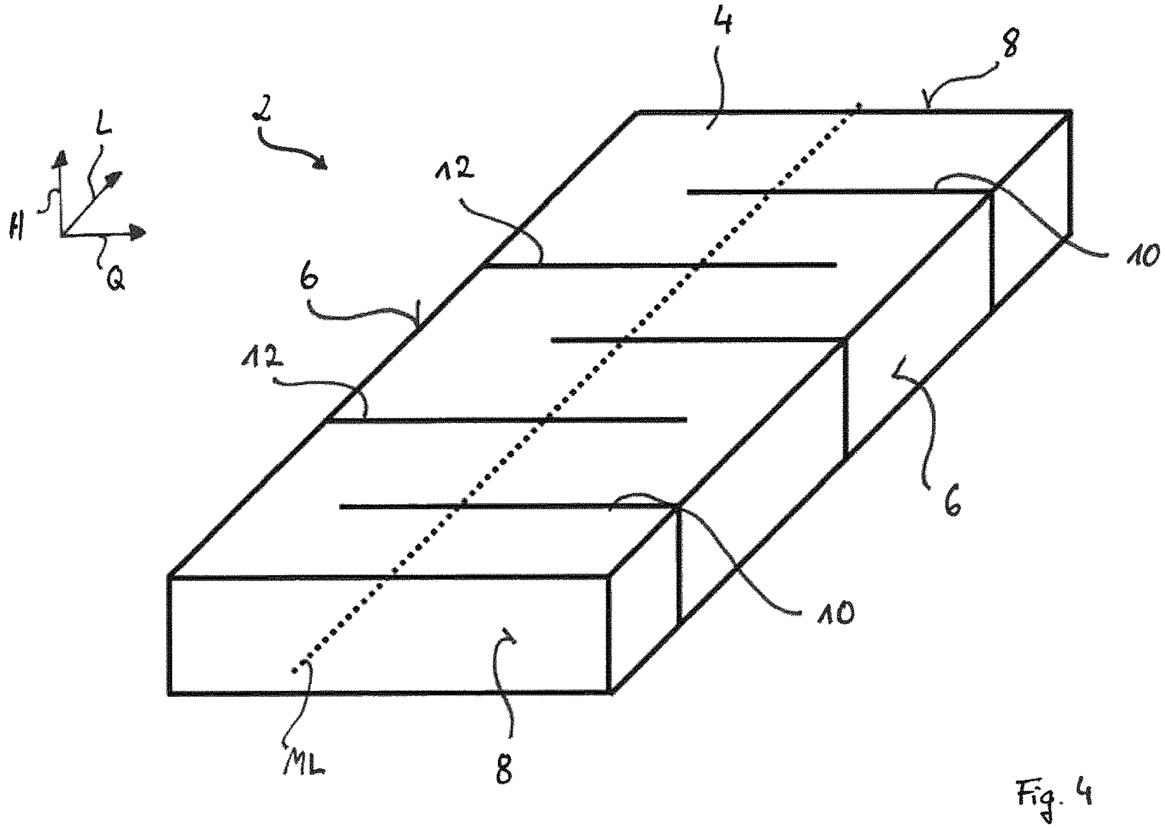
FIG. 4 shows a magnetic element in a third embodiment.

An exemplary embodiment of the magnetic element 2 with an only axial segmentation is shown in FIG. 4. The embodiment corresponds substantially to the embodiment of FIG. 3 described above, wherein the angle of inclination 14 of the recesses 10, 12 in relation to the longitudinal direction L is dimensioned at 90° so that the recesses 10, 12 run parallel to the cross direction Q.

Figure 5:
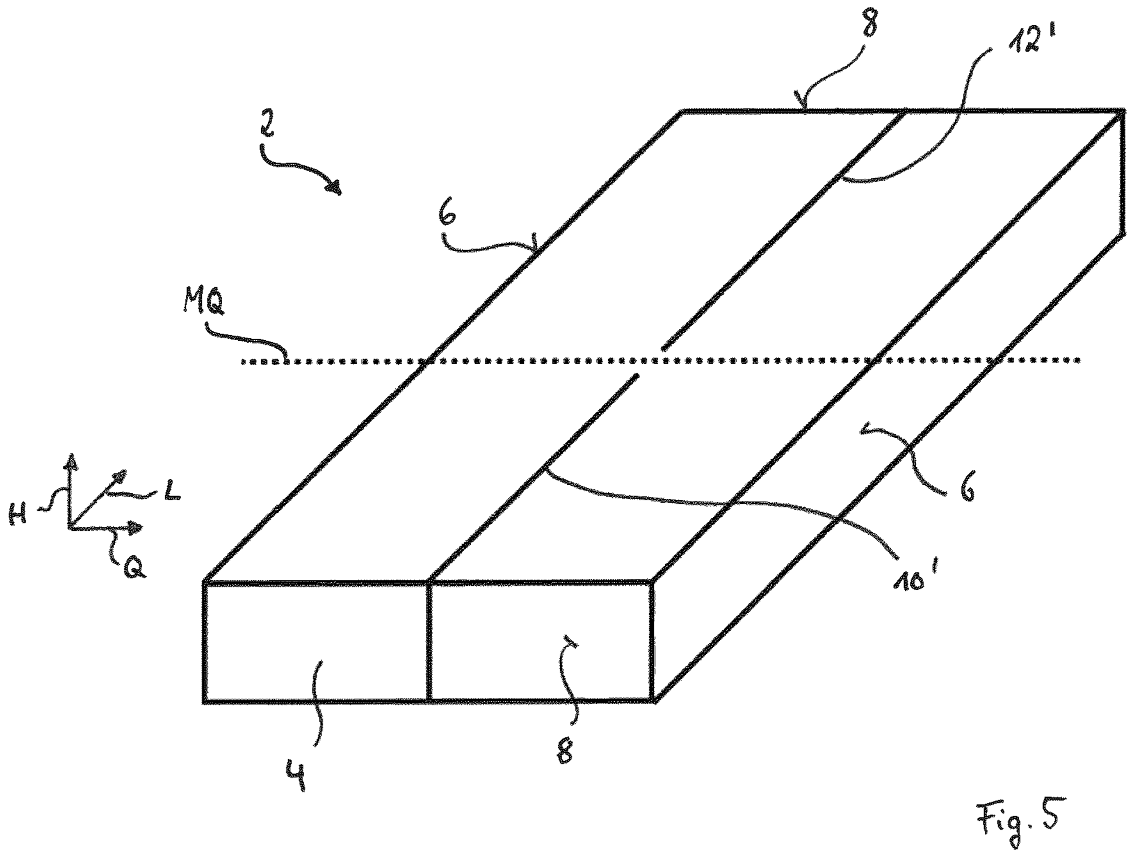
FIG. 5 shows a magnetic element in a fourth embodiment.
Figure 6:
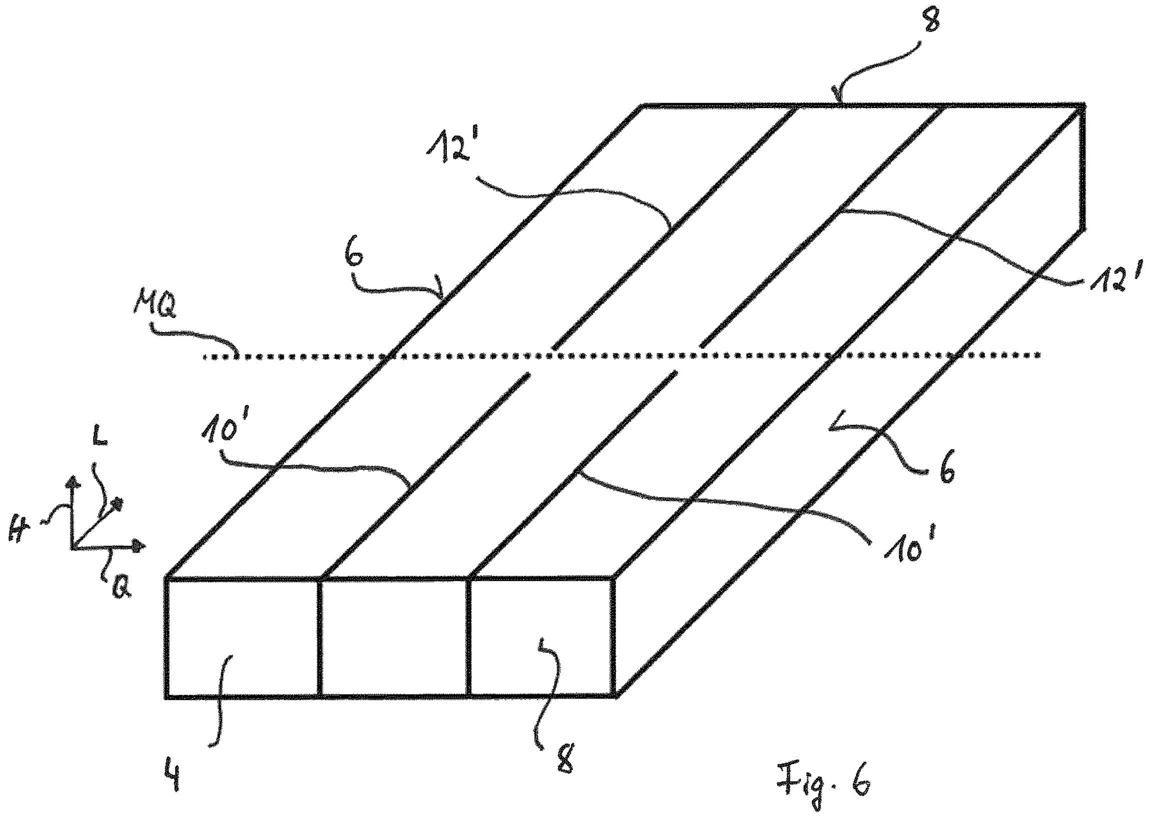
FIG. 6 shows a magnetic element in a fifth embodiment.

An only tangential segmentation of the magnetic body 4 to reduce the eddy current losses is shown in the exemplary embodiments of FIG. 5 and FIG. 6. The recesses 10' and 12' extend in this case from the transverse sides 8 to a (transverse) center axis MQ of the magnetic body 4. The center axis MQ runs in this case along the cross direction Q on half the length of the magnetic body 4. The recesses 10' and 12' run parallel to the length direction L and are oriented flush with one another in length direction L.

In the embodiment of FIG. 5, only in each case one recess 10' and 12' is incorporated into the magnetic body 4 at the height of the center axis ML, wherein FIG. 6 shows an exemplary embodiment with in each case two recesses 10' and 12'.

The invention is not restricted to the exemplary embodiments described above. On the contrary, other variants of the invention can also be derived from these by the person skilled in the art without departing from the subject matter of the invention. In particular, all of the individual features described in conjunction with the exemplary embodiments can furthermore also be combined with one another in another manner without departing from the subject matter of the invention.

LIST OF REFERENCE SIGNS

2 Magnetic element
4 Magnetic body
6 Longitudinal side
8 Transverse side
10, 10' Recess
12, 12' Recess
14 Angle of inclination
16 Eddy current
Q Cross direction
L Length direction
H Vertical direction
ML, MG Center axis
B Magnetic field

The invention claimed is:

1. A magnetic element for an electric machine, the magnetic element comprising:
- a one-piece magnetic body composed of a permanently magnetic material,
- said magnetic body having two longitudinal sides extending along a longitudinal length direction, two transverse sides extending in a transversal cross direction, and a center;
- said longitudinal sides and said transverse sides each including a first side and a second side opposite said first side;
- a number of mutually parallel, slot-shaped first recesses formed in said magnetic body, said first recesses extending from a first longitudinal side towards said center of said magnetic body and not extending beyond the center of the magnet body; and
- a number of mutually parallel, slot-shaped second recesses formed in said magnetic body, said second recesses extending from a second longitudinal side opposite said first side towards said center of said magnetic body and not extending beyond the center of the magnet body; and
- the first recesses and the second recesses completely passing through the magnet body along a height direction oriented perpendicularly to the longitudinal direction and the transverse direction, the first recesses and the second recesses being oriented obliquely to the longitudinal direction and to the transverse direction, and the orientations of the first recesses and the second recesses being configured to be mirror-symmetrical with respect to the center of the magnet body.

2. The magnetic element according to claim 1, wherein said first and second recesses extend from said longitudinal sides toward said center of said magnetic body.

3. The magnetic element according to claim 1, wherein said first recesses and said second recesses are incorporated into said magnetic body to suppress magnetically induced eddy currents along the length direction and the cross direction in the magnetic body when a magnetic field is oriented perpendicular to the length direction and cross direction.

4. The magnetic element according to claim 1, wherein said first and second recesses are oriented at an angle of inclination between 60° and 30° with respect to the length direction.

5. The magnetic element according to claim 1, wherein said first and second recesses are oriented at an angle of inclination between 50° and 40° with respect to the length direction.

6. The magnetic element according to claim 1, wherein said first and second recesses are oriented at an angle of inclination of 45° with respect to the length direction.

7. The magnetic element according to claim 1, wherein said first recesses and said second recesses are arranged offset with respect to one another along the length direction.

8. The magnetic element according to claim 1, wherein the number of said first recesses is equal to the number of said second recesses.

9. The magnetic element according to claim 1, wherein said recesses are evenly distributed along the respective said longitudinal side.

10. The magnetic element according to claim 1, wherein said first recesses and said second recesses are incorporated into said magnetic body by wire cutting.

11. The magnetic element according to claim 1, wherein all of said first recesses or all of said second recesses are commonly formed into said magnetic body by multi-wire cutting.

12. The magnetic element according to claim 1, wherein all of said first recesses are commonly incorporated into said magnetic body by multi-wire cutting and all of said second recesses are commonly formed into said magnetic body by multi-wire cutting.

13. The magnetic element according to claim 1, wherein at least one of said number of first recesses or said number of said second recesses extend beyond said center of said magnetic body.

14. An electric machine for a motor vehicle, the electric machine comprising a permanently excited machine part with at least one magnetic element according to claim 13.

* * * * *